(No Model.)
2 Sheets—Sheet 2.

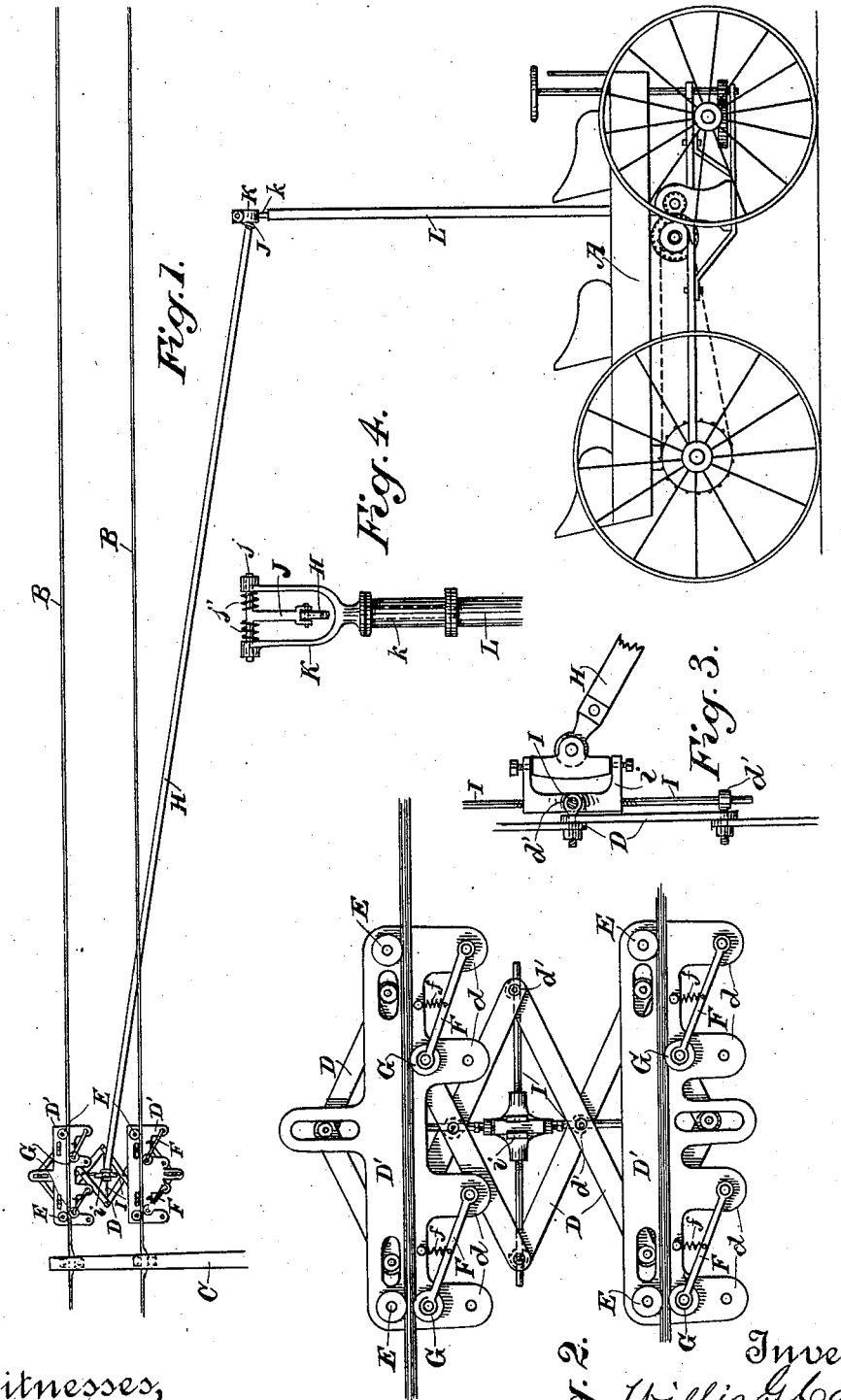

W. G. CAFFREY.
TROLLEY SYSTEM.

No. 576,721.  Patented Feb. 9, 1897.

WITNESSES
B. H. Loucks.
J. Edw. Fowler.

INVENTOR
Willis G. Caffrey
by Dewey & Co.
Attorneys

UNITED STATES PATENT OFFICE.

WILLIS G. CAFFREY, OF RENO, NEVADA.

TROLLEY SYSTEM.

SPECIFICATION forming part of Letters Patent No. 576,721, dated February 9, 1897.

Application filed April 2, 1896. Serial No. 585,906. (No model.)

*To all whom it may concern:*

Be it known that I, WILLIS G. CAFFREY, a citizen of the United States, residing at Reno, county of Washoe, State of Nevada, have invented an Improvement in Trolley Connections and Conductors for Electrically-Propelled Vehicles; and I hereby declare the following to be a full, clear, and exact description of the same.

My invention relates to the general class of electrically-propelled vehicles and to the trolleys and electric conductors necessary for establishing the circuit through the motor.

My invention consists in the novel construction of the trolley, the means for adjustably securing it to the vehicle, and other details of construction, arrangement, and combination, all of which I shall hereinafter fully describe.

The object of my invention is to provide for the electric propulsion of vehicles, either on rails or over ordinary roads, by establishing a direct circuit through the motor from and back again through the conductors, thus dispensing with the usual rail and grounded returns, and to this end I employ a plurality of conductors and a trolley adapted to complete the motor-circuit both from and to said conductors.

Figure 5:
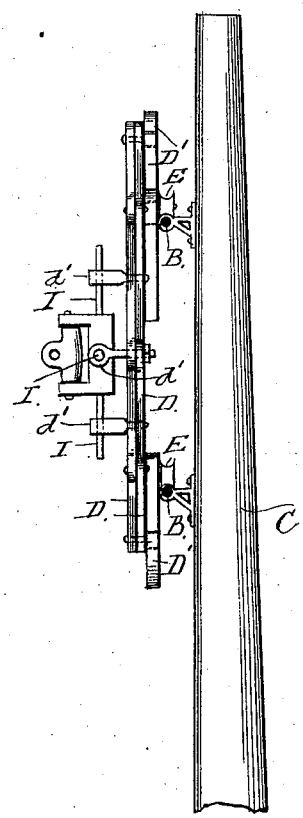
Figure 6:
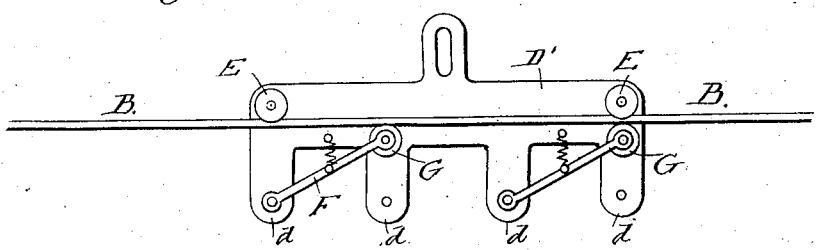

Referring to the accompanying drawings, Figure 1 is a side elevation. Fig. 2 is a side view of my trolley. Fig. 3 is a view of the pole connection with trolley. Fig. 4 is a view of pole connection with the vehicle. Fig. 5 is an edge view of the trolley. Fig. 6 is a detail to be referred to.

A represents a vehicle. This may be a car on rails or, as here indicated, an ordinary wheeled vehicle adapted to travel over ordinary roads and to be provided with a motor, gearing, and suitable steering apparatus, all as indicated.

B B are electric conductors or wires. These are mounted suitably on poles C, and there is a plurality of them, two being here shown, and preferably arranged in a vertical plane, one above the other.

The trolley is a composite one and consists of an adjustable frame comprised of bars D, pivoted together after the manner of "lazy-tongs," so that it can expand and contract in length. The extremities of these bars are properly guided in slotted plates D', in which are journaled the contact-rollers E, which travel on the wires B B. These plates have downwardly-extending arms $d$, to which are pivoted the arms F, which carry the rollers G, adapted to travel under the wires B B and to be automatically held up thereto by springs $f$. The arms F are pivoted to two of the arms $d$ when proceeding in one direction and are shifted to the other two arms $d$ when moving in an opposite direction, as shown in Fig. 6.

H is the trolley pole or cable. At its outer extremity it is pivoted both horizontally and vertically to the center or intersection bracket $i$ of the cross-guide rods I, whereby it may move in both directions to accommodate variations in the course of travel of the vehicle.

The pivotal pins of bars D at the intersection of what may be termed their "middle" quadrilateral are provided with eyes $d'$, which slide freely over the guide-rods I. Thus the point $i$ being always in the middle is not affected by the different positions which the whole frame may assume in lengthening or contracting, and said frame may therefore adjust itself freely to the necessities of its position, always maintaining its proper contact with the duplicate wires. This automatic adjustment of the trolley-frame is due to the spring-controlled rollers G acting under the wires in such manner as to follow their courses and expand or contract the frame, as required, and thus hold the contact-rollers E to their work.

The attachment of the trolley pole or cable H to the vehicle is as follows: It is carried by an arm J, which swings with a shaft $j$, mounted in a bracket K, the stem $k$ of which is fitted to turn in a bearing L, secured to the vehicle. On the shaft $j$ are oppositely-acting controlling-springs $j'$, which serve to hold and return the arm J to a perpendicular and to permit its yielding in either direction to the strain or position of the trolley-pole.

Having thus described my invention, what I claim as new, and desire to secure by Letters Patent, is—

1. In the electric propulsion of vehicles, the combination, of a positive and negative conductor arranged in a vertical plane, one above the other, and a trolley to travel in contact with the conductors and consisting of pivoted bars forming an extensible and contractible frame, slotted plates in which the frame-bars are guided, contacts carried by the plates and removable and reversible arms pivoted to the plates and carrying contacts, said arms being provided with springs for holding their contacts up to the conductors.

2. In the electric propulsion of vehicles, the combination of independent wires arranged in a vertical plane, one above the other, one forming the inleading and the other the return wire to and from the motor and an automatically-adjustable trolley with suitable electrical connections, said trolley traveling in electrical contact with said conductors and adapted to conform to their variations and consisting of an extensible and contractible frame of pivotally-secured bars and slotted guides therefor, said frame carrying contact-rollers, and other rollers traveling against the conductors to conform the frame to the position of said conductors and hold the contact-rollers thereto.

3. In the electric propulsion of vehicles, the combination of positive and negative conductors arranged vertically one above the other, one forming the inleading and the other the return wire to and from the motor and an automatically-adjustable trolley with suitable electrical connections, said trolley traveling in electrical contact with said conductors and adapted to conform to their variations and consisting of the pivoted bars forming an extensible and contractible frame, and carrying contact-rollers, and other rollers spring-controlled and traveling against the conductors to conform the frame to the position of said conductors and hold the contact-rollers thereto.

4. In the electric propulsion of vehicles, the combination of positive and negative conductors arranged vertically one above the other, one forming the inleading and the other the return wire to and from the motor and an automatically-adjustable trolley with suitable electrical connections, said trolley traveling in electrical contact with said conductors and adapted to conform to their variations and consisting of the pivoted bars forming an extensible and contractible frame and having contact-rollers, and the cross guide-rods secured to the trolley pole or cable and on which the said adjustable frame slides centrally.

5. In the electric propulsion of vehicles, the combination of positive and negative conductors arranged vertically one above the other, one forming the inleading and the other the return wire to and from the motor and an automatically-adjustable trolley with suitable electrical connections, said trolley traveling in electrical contact with said conductors and adapted to conform to their variations and consisting of the pivoted bars forming an extensible and contractible frame and having contact-rollers, other rollers spring-controlled and traveling against the conductors to conform the frame to the position of said conductors and hold the contact-rollers thereto, and the cross guide-rods secured to the trolley pole or cable and on which the said adjustable frame slides centrally.

6. The composite trolley consisting of the pivoted bars forming an extensible and contractible frame, the centrally-located cross guide-rods secured to the trolley pole or cable and on which the said frame slides in adjusting itself, the contact-rollers carried by the frame, and the spring-controlled swinging rollers carried by said frame and acting against the conductors to adjust said frame and hold its contact-rollers to the conductors.

7. The composite trolley consisting of pivotal bars forming an extensible and contractible frame, the cross guide-rods secured to the trolley pole or cable and on which the frame slides in adjusting itself, the slotted plates in which the extremities of the frame are guided, the contact-rollers carried by the plates and the spring-controlled swinging rollers carried by said plates and acting against the conductors to adjust said frame and hold its contact-rollers to the conductors.

8. The extensible and contractible trolley, consisting of the pivoted bars with its rollers, and the cross-rods on which said bars are guided, in combination with the trolley pole or cable and the double joint between said pole or cable and the cross-rods.

In witness whereof I have hereunto set my hand.

WILLIS G. CAFFREY.

Witnesses:
G. W. HAZLETT,
W. P. MCLAUGHLIN.